Aug. 28, 1928.
P. DAHLMAN
1,682,554
POTATO PICKER AND BAGGER
Filed March 16, 1923     2 Sheets-Sheet 1
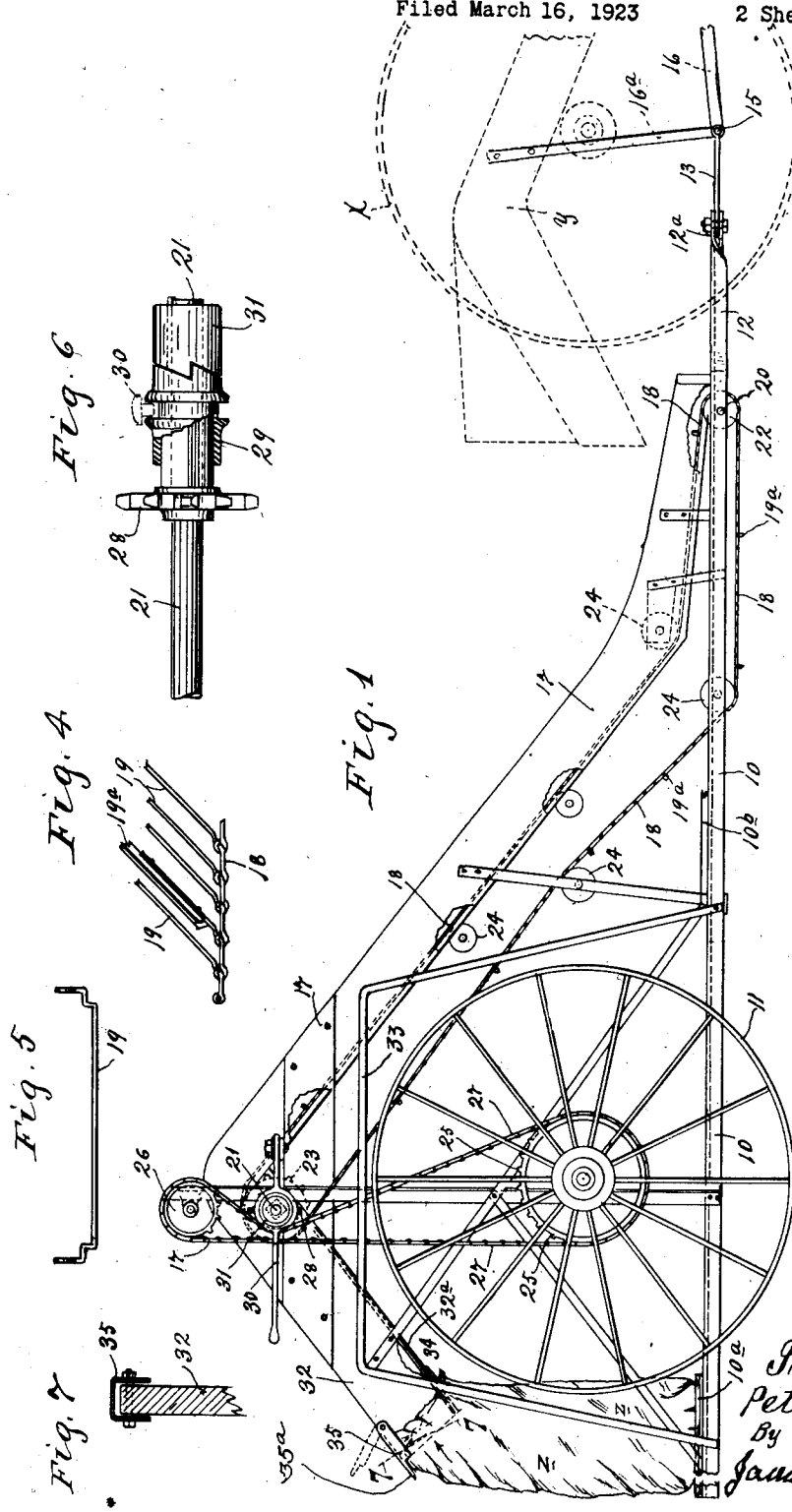
Inventor.
Peter Dahlman
By his attorney
James F. Williams Aug. 28, 1928.
P. DAHLMAN
1,682,554
POTATO PICKER AND BAGGER
Filed March 16, 1923   2 Sheets-Sheet 2
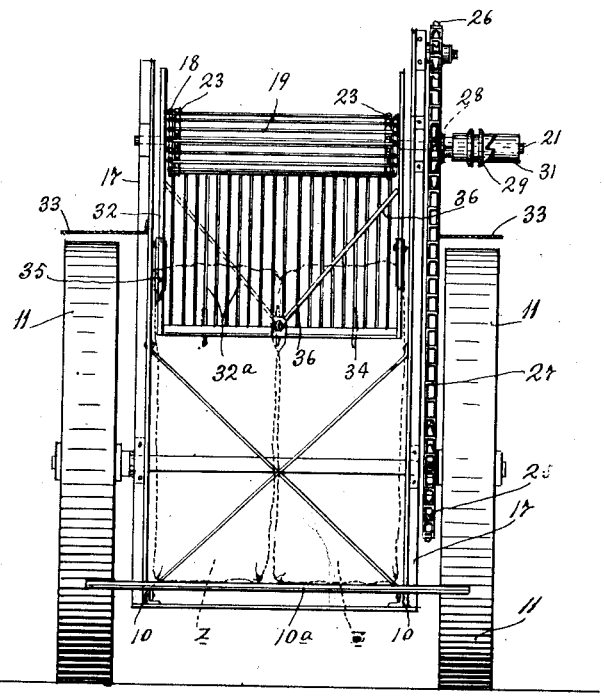
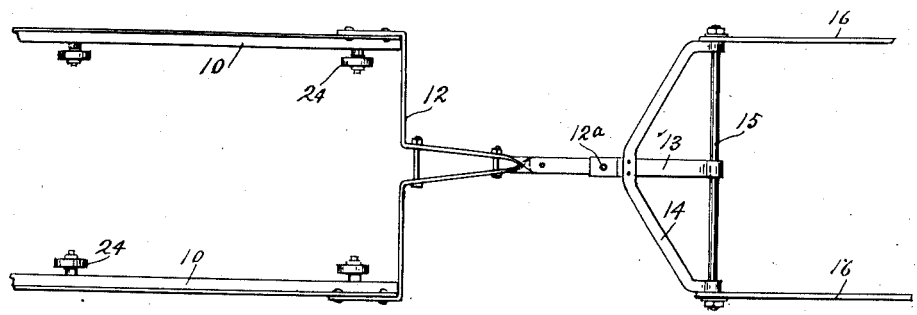

Patented Aug. 28, 1928.

1,682,554

UNITED STATES PATENT OFFICE.

PETER DAHLMAN, OF GRANDY, MINNESOTA.

POTATO PICKER AND BAGGER.

Application filed March 16, 1923. Serial No. 625,602.

This invention relates to a picking and bagging attachment for a potato digger to be coupled behind the latter at its delivery end.

It is an object of the invention to provide such a device which will pick up the potatoes as they are ejected from the digger and distributing them into bags without any interruption in the process due to the shifting of the bags.

It is a further object to provide such a device of very simple structure, but of high efficiency, which will be an important labor saving factor in the harvesting of potatoes.

To these ends, my invention consists of the novel devices and combinations of devices herein described and pointed out in the claims. The invention is illustrated in the accompanying drawings wherein like references refer to similar parts throughout the several views and in which:

Fig. 1 is a side elevation of the device in its preferred form with dotted lines indicating the rear end of a potato digger;

Fig. 2 is a rear elevation of the same;

Fig. 3 is a somewhat diagrammatical plan view of the frame with the means for coupling the same to a potato digger;

Fig. 4 is a detail in perspective of a portion of the linked carrier;

Fig. 5 is a detail elevation of a single carrier link;

Fig. 6 is a detail elevation of the clutch employed with some parts broken away; and Fig. 7 is a detail section of the clamping bag holder taken on the line 7—7 of Fig. 1 and looking in the direction of the arrows.

The rear of a potato digger of standard form is designed by the letter $x$ having the usual framework $y$.

The attachment has a frame 10, near the rear end of which are journalled a pair of wheels 11. This frame is coupled to the rear end of a digger by a special coupling device comprising a pair of brackets 12 secured to the front of the frame and secured together at their other ends to form a split tongue 12$^a$, to and between which a strong link 13 is pivoted for horizontal pivotal motion. A substantially U-shaped brace bar 14 is secured to this link 13, the outer ends of which are alined with the outer end of said link and both are pivotally connected to a transverse draft shaft 15, thus forming a hinge connection for vertical pivotal motion. The outer ends of said shaft 15 are pivotally connected to longitudinal reach bars 16 and brace bars 16$^a$, which are rigidly secured to the under part of the digger frame. It may be readily seen that this coupling device permits of angular motion in either a horizontal or vertical plane or both. This is of great importance, for the attachment as shown in Fig. 1 must underlie the digger close to the ground just below the delivery end of the same and still not bump against the digger or the ground when going over irregular land. It must also obviously follow the digger on turns.

An elevator comprising a frame 17 and an endless carrier 18 is suitably supported from the framework 10 of the attachment. The endless carrier 18 is made up of transverse link rods 19, as shown in Fig. 4, having their carrying portions bent slightly down, as shown in Fig. 5, to prevent the potatoes from rolling to the sides when in transit and bruising against the sides of the frames 17. At intervals along the endless carrier, upstanding slats 19$^a$ are secured to the links 19, materially assisting in the process of elevating. The numeral 20 designates a shaft journalled to the main frame work 10 at the lower end of the elevator and the numeral 21 indicates a driving shaft journalled on said framework at the upper end of the elevator. A roller 22 is mounted in the shaft 20 and two sprocket wheels 23 are keyed to the shaft 21 near the ends of the same. The endless carrier 18 is mounted on the roller 22 and the sprockets 23, its rods meshing with said sprockets at both sides. Several guide rollers 24 are mounted on the framework and engage against the carrier at different points to keep the same in proper operative position.

Travelling movement is imparted to the endless carrier 18, preferably in the following way: A relatively large sprocket wheel 25 is secured to one of the wheels 11. This sprocket is connected to a vertically alined idler 26 above the former by means of an endless chain 27. Since the driving motion must be reversed to move the carrier in the right direction, a relatively small pinion wheel 28 loosely mounted on the outer end of the driving shaft 21 and substantially in vertical alinement with the idler 26, engages the chain 27 on its outer forward side. A half-clutch 29 is carried by the hub of the sprocket 28 with freedom for sliding motion thereon and subject to a shipper fork 30 pivoted to the elevator frame 17, by which it may be shifted into engagement with a half clutch 31, secured to the driving shaft 21.

Directly behind said elevator structure in position to receive from the same is a delivery chute 32 having a longitudinal slatted bottom 32$^a$ shown in Fig. 2.

The main frame 10 is extended at its rear end to provide a platform 10$^a$ which will support two potato sacks $z$ and also permit an operator to stand thereon and operate the machine. The wheels are covered by fenders 33 and the sides of the frame are provided with running boards 10$^b$.

The two bags $z$ while resting on the platform 10$^a$ are held open in receiving position by means of small hooks 34 on the bottom of the delivery chute 32 co-operating with clamping levers 35 of U-shaped cross-section pivoted to the side boards of the delivery chute near the lower ends thereof. These clamping levers are adapted to be swung down to grip a portion of the bag $z$ between the lever and the side of the chute said levers having handle portions 35$^a$ at their forward ends. The position of the two bags can be clearly seen in Fig. 2, the bags being indicated by dotted lines.

Pivoted at the center of the delivery chute 32 at its lower end is a distributing cut-off valve in the form of a shift board 36. This board when swung over to one side permits the potatoes to be distributed solely to one of the bags, while the delivery to the other is simultaneously cut off, thus while one bag is being filled, the other may be readily detached.

The operation of the device is probably obvious from the above describtion but may be briefly described as follows: The attachment drawn behind the digger receives the potatoes from the latter on the lower portion of the endless carrier 18. The open link structure of the carrier permits foreign matter to drop through the same as the potatoes are elevated to the distributing chute. The potatoes will be carried to the delivery chute, also of open structure and will slide down the same into one of the open bags $z$ held in receptive position. When this bag is filled, the shift board 36 is turned to the other side and the delivery is shifted to the other bag permitting the first bag to be quickly released and disposed of and a new empty bag supplied. The improved clamping levers permit the bags to be quickly detached and attached. Extra bags may be carried on the wheel fenders 33.

Extensive usage of the device has shown that one man can operate the same and can bag four to six acres a day thus doing the work of from five to nine men picking by hand. The potatoes in no step of the above operation have any chance of bruising, since the structure involves no dropping of any considerable distance. Also the bent down link rod structure of the carrier prevents the potatoes from bumping and bruising against the sides 17.

From the above description, it is apparent that the applicant has provided an extremely simple and highly efficient device for picking and bagging potatoes as they are ejected from the delivery chute of a digger and one which is of great importance as a labor saving factor in potato raising.

It will, of course, be understood that various changes may be made in the form, details and arrangement of the parts without departing from the scope of the invention.

What is claimed is:

1. A potato picking and bagging device adapted to be connected to and drawn by a standard potato digger comprising a potato delivering means having in combination, a wheel-supported frame, an upwardly inclined open bottom trough at one end of said frame extending at one side of and with its center line substantially at right angles to the axis of said wheels, an endless conveyor movable in said trough, said trough and conveyor having their lower ends disposed substantially in horizontal position and constructed and arranged to extend beneath the delivery end of said potato digger to receive potatoes therefrom, a chute longitudinally alined with said trough extending downwardly from the upper end of said trough and at the other side of said axis adapted to receive the potatoes from said conveyor, and means for supporting and holding bags at the lower end of said chute for receiving the potatoes discharged therefrom.

2. A potato picking and bagging device adapted to be connected to and drawn by a standard potato digger comprising a potato delivering means having in combination, a wheel-supported frame, an upwardly inclined open bottom trough extending at one side of and with its center line substantially at right angles to the axis of said wheel, a horizontally disposed runningboard extending along the forward portion of said trough, an endless conveyor movable in said trough, said trough and conveyor being constructed and arranged to extend beneath the delivery end of a potato digger to receive potatoes therefrom, a chute longitudinally alined with said trough extending from the top of said trough downwardly at the other side of said axis adapted to receive potatoes from said conveyor, a platform at the rear of said frame adapted to support an operator and also adapted to support sacks for receiving potatoes from said chute, and means for holding said sacks in operative relation to said chute.

3. A potato picking and bagging device adapted to be connected to and drawn by a standard potato digger comprising a potato delivering means having in combination, a wheel supported frame, an upwardly inclined open bottom trough at one end of said frame extending with its center line substantially at right angles to the axis of said line and having its upper end substantially vertically alined with said axis, an endless conveyor movable in said trough and driven from said wheels, said trough and conveyor having their lower ends disposed substantially in horizontal position and constructed and arranged to extend beneath the delivery end of said potato delivering means of said digger, a chute longitudinally alined with said trough and conveyor extending from the top of said trough downwardly at the other side of said trough adapted to receive potatoes from said conveyor, a platform at the rear of said frame adapted to support an operator and also adapted to support sacks for receiving potatoes from said chute and means engaging the sides of said chute for holding sacks in operative position to receive potatoes therefrom.

In testimony whereof I affix my signature.

PETER DAHLMAN.